United States Patent
Ishikura (10) Patent No.: US 10,151,941 B2
(45) Date of Patent: Dec. 11, 2018

(54) OPTICAL MODULATION ELEMENT, OPTICAL MODULATOR, AND MANUFACTURING METHOD OF OPTICAL MODULATION ELEMENT

(71) Applicant: Fujikura Ltd., Tokyo (JP)

(72) Inventor: Norihiro Ishikura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/443,040

(22) Filed: Feb. 27, 2017

(65) Prior Publication Data

US 2018/0011347 A1 Jan. 11, 2018

(30) Foreign Application Priority Data

Jul. 6, 2016 (JP) .................................. 2016-134530

(51) Int. Cl.
*G02F 1/025* (2006.01)
(52) U.S. Cl.
CPC ........ *G02F 1/025* (2013.01); *G02F 2201/063* (2013.01)
(58) Field of Classification Search
CPC ............................ G02F 1/025; G02F 2201/063
See application file for complete search history.

(56) References Cited

U.S. PATENT DOCUMENTS

| 6,845,198 B2 * | 1/2005 | Montgomery ........ G02F 1/2257 359/245 |
| 7,747,122 B2 | 6/2010 | Shetrit et al. |
| 8,149,493 B2 * | 4/2012 | Chen ....................... G02F 1/025 359/250 |
| 8,737,772 B2 * | 5/2014 | Dong ...................... G02F 1/025 385/2 |

(Continued)

FOREIGN PATENT DOCUMENTS

| CN | 103226252 A | 7/2013 |
| JP | 2016-524722 A | 8/2016 |
| WO | 2014/185951 A1 | 11/2014 |

OTHER PUBLICATIONS

Cao et al., "Design of a silicon Mach-Zehnder modulator with a U-type PN junction", Applied Optics, Aug. 20, 2013, vol. 52, No. 24, pp. 5941-5948, (8 pages).

(Continued)

*Primary Examiner* — Daniel Petkovsek
(74) *Attorney, Agent, or Firm* — Westerman, Hattori, Daniels & Adrian, LLP (57) ABSTRACT

Provided is an optical modulation element which includes an optical waveguide. The optical waveguide includes: a rib part; a first slab part extending from the first side face of the rib part; aid a second slab part extending from the second side face of the rib part. The optical waveguide includes a first semiconductor region and a second semiconductor region which have an opposite conductive type from each other. The first semiconductor region includes an upper (Continued)

section, a lateral section, and a lower section. The second semiconductor region is sandwiched between the upper section and the lower section so as to be substantially in direct contact with the upper section, the lateral section, and the lower section. At least one of an end face of the upper section and an end face of the lower section flushes with the first side face of the rib part.

5 Claims, 8 Drawing Sheets

(56) References Cited

U.S. PATENT DOCUMENTS

| | | | | |
|---|---|---|---|---|
| 9,323,079 | B1* | 4/2016 | Feng | G02F 1/025 |
| 9,638,942 | B2* | 5/2017 | Baehr-Jones | G02F 1/025 |
| 2011/0206313 | A1 | 8/2011 | Dong et al. | |
| 2013/0188902 | A1 | 7/2013 | Gardes et al. | |
| 2014/0127842 | A1 | 5/2014 | Song et al. | |
| 2014/0341497 | A1 | 11/2014 | Liu et al. | |
| 2016/0004104 | A1 | 1/2016 | Feng et al. | |
| 2016/0313577 | A1* | 10/2016 | Sun | G02F 1/025 |
| 2017/0102564 | A1* | 4/2017 | Sakamoto | G02F 1/0123 |

OTHER PUBLICATIONS

Thomson et al., "High speed silicon optical modulator with self aligned fabrication process", Optics Express, Aug. 30, 2010, vol. 18, No. 18, pp. 19064-19069, (6 pages).

Soref et al., "Electrooptical effects in silicon", IEEE Journal of Quantum Electronics, Jan. 1987, vol. QE-23, No. 1, pp. 123-129, (7 pages).

Office Action dated Feb. 27, 2018, issued in counterpart Japanese Application No. 2016-134530, with English translation (7 pages).

* cited by examiner

OPTICAL MODULATION ELEMENT, OPTICAL MODULATOR, AND MANUFACTURING METHOD OF OPTICAL MODULATION ELEMENT

BACKGROUND OF THE INVENTION

Field of the Invention

The present invention relates to optical modulation element, optical modulator, and manufacturing method of the optical modulation element.

Priority is claimed on Japanese Patent Application No. 2016-134530, filed Jul. 6, 2016, the contents of which are incorporated herein by reference.

Description of the Related Art

In optical communication, modulation elements are used to convert electrical signals into optical signals. One known example is an optical modulation element which is formed by implanting P-type dopant and N-type dopant into part of an optical waveguide made of semiconductor material. Such an optical modulation dement is provided with an electrode in each of the P doped region and the N doped region. Application of electrical signals through the electrodes enables control of refractive index in the optical waveguide.

U.S. Pat. No. 7,747,122 specification (Patent Document 1) discloses an optical modulation element in which the junction plane (PN-junction portion) between the P doped region and the N doped region extends along the top face and the side face of the rib part of the optical waveguide. In this optical modulation element, the PN-junction portion is provided only in the vicinity of the top face and the vicinity of the side face of the rib part.

Tongtong Cao, Yonghao Fei, Libin Zhang, Yanmei Cao, and Shaowu Chen, "Design of a silicon Mach-Zehnder modulator with a U-type PN junction", Applied Optics, vol. 52, No. 24, p. 5941-5948 (2013) (Non-Patent Document 1) discloses an optical modulation element and a manufacturing method thereof, in which doping is performed so that the P doped region is sandwiched between the N doped regions in the center of the rib part. In this optical modulation element, a PN-junction portion is provided only in the vicinity of the rib part.

D. J. Thomson, F. Y, Gardes, G. T. Reed, F, Milesi, and J-M Fedeli, "High speed silicon optical modulator with self aligned fabrication process". Optics Express, vol. 18, No. 18, p. 19064-19069 (2010) (Non-Patent Document 2) discloses a method of forming a PN junction in an SOI substrate. In accordance with this method, an N-type dopant is implanted into the slab part using a mask which has been used in the formation of the slab part, and therefore a PN junction plane will be formed on the side face of the rib part (along the boundary between the rib part and the slab part).

The optical modulation element disclosed in Patent Document 1 can be relatively easily produced since the shape of the P-type region and the N-type region is simple. However, the area of the PN junction plane may be insufficient for a device requiring higher modulation efficiency.

In accordance with the manufacturing method of an optical modulation element disclosed in Non-Patent Document 1, the N doped region is limited, and thus the PN junction plane is formed only in the vicinity of the center of the rib part of the obtained optical modulation element. However, the area of the PN junction plane may be insufficient for a device requiring higher modulation efficiency.

In accordance with the manufacturing method of an optical modulation element disclosed in Non-Patent Document 2, a PN junction plane can be formed in a silicon substrate with high accuracy of position. However, the document is silent as to manufacturing of an optical modulation element having multiple PN junction planes.

It is one object of the present invention to provide an optical modulation element, an optical modulator, and a manufacturing method of an optical modulation element for higher modulation efficiency.

SUMMARY OF THE INVENTION

An optical modulation element according to an aspect of the present invention includes an optical waveguide. The optical waveguide includes: a rib part having a top face, a bottom face, a first side face, and a second side face; a first slab part extending from the first side face; and a second slab part extending from the second side face. The optical waveguide includes a first semiconductor region of a first conductive type and a second semiconductor region of a second conductive type, the second conductive type having electrically an opposite sign from the first conductive type. The first semiconductor region includes an upper section extending along the top face of the rib part a lateral section extending along the second side face of the rib part, and a lower section extending along the bottom face of the rib part. The second semiconductor region is sandwiched between the upper section and the lower section so as to be substantially in direct contact with the upper section, the lateral section, and the lower section. At least one of an end face of the upper section and an end face of the lower section flushes with the first side face.

In the optical modulation element described above, it may be arranged such that both of the end face of the upper section and the end face of the lower section flush with the first side face.

In the optical modulation element described above, it may be arranged such that the tower section extends to the inside of the first slab part.

In the optical modulation element described above, it may be arranged such that the first conductive type is N-type, and the second conductive type is P-type.

An optical modulator according to another aspect of the present invention includes the optical modulation element described above.

In a manufacturing method of an optical modulation element according to another aspect of the present invention, in which the element includes: a rib part having a top face, a bottom face, a first side face, and a second side face; a first slab part extending from the first side face; and a second slab part extending from the second side face, the method including: implanting into a substrate a dopant of a first conductive type and a dopant of a second conductive type, the second conductive type having electrically an opposite sign from the first conductive type, to form a first layer of the first conductive type, a second layer of the second conductive type, and a third layer of the first conductive type in the substrate such that the first layer, the second layer, and the third layer are arranged in this order along a thickness direction of the substrate; forming a first mask on a surface of the first layer; removing the first layer and art upper part of the second layer at which the first mask m1 has not been formed, to form the first slab part, the second slab part, and the rib part the rib part covered with the first mask; forming a second mask on part of a surface of the first mask and an entire surface of the second slab part; injecting a dopant of the second conductive type over the first mask and the second mask to implant the dopant of the second conductive type into the first slab part; removing the first mask and the second mask; forming a third mask on an entire surface of the first slab part of the second conductive type and a surface of the rib part such that the surface of the rib part is exposed from the third mask in the vicinity of the second side face; injecting a dopant of the first conductive type over the third mask to implant the dopant of the first conductive type into a region over the second slab part and the rib part, the region exposed from the third mask; and removing the third mask.

According to some aspects of the present invention, it is possible to pro vide an optical modulation element, an optical modulator, and a manufacturing method of an optical modulation element for the achievement of higher modulation efficiency.

DESCRIPTION OF THE PREFERRED EMBODIMENTS

First, control of the refractive index and the modulation efficiency of an optical modulation element formed in an optical waveguide, which includes semiconductor material, will be explained.

There are some methods to control the refractive index of semiconductor materials. In particular, a method using carrier plasma effect is known to change the refractive index of silicon in nano-second order. In accordance with the carrier plasma effect, change in carrier concentration (e.g., hole concentration and electron concentration) in a media causes refractive index change of the media.

R. A. Soref and B. R. Bennett; "Electrooptical effects in silicon", IEEE J. Quantum Electron. 23, 123-129 (1987) describes that, complex refractive index change $\Delta n$ of P-type and N-type silicon with respect to light with a wavelength of 1.55 μm is expressed by the following Equation 1 and Equation 2.

$$Re[\Delta n] = -(8.8 \times 10^{-22}) \times \Delta N_e - (8.5 \times 10^{-18}) \times \Delta N_h^{0.8}$$ [Equation 1]

$$Im[\Delta n] = (8.5 \times 10^{-18}) \times \Delta N_e + (6.0 \times 10^{-18}) \times \Delta N_h$$ [Equation 2]

Here $\Delta N_e$ is amount of change in electron concentration [$cm^{-3}$], while $\Delta N_h$ is amount of change in hole concentration [$cm^{-3}$]. The unit of Im [$\Delta n$] is Naper/cm.

As is appreciated with the above Equation 1, the greater the amount of change in electron concentration and hole concentration is, the greater the amount of the real-part refractive index change is. In particular, the amount of change in hole concentration has a greater contribution to the amount of the real-part refractive index change.

A silicon substrate including a P-type region and an N-type region has a region, so-called a depletion layer at and around the boundary between the P-type region and the N-type region in which very few carriers (holes and electrons) exist. When applying reverse bias voltage to the depletion layer (PN-junction portion), the width of the depletion layer will change, which changes the carrier concentration.

For this reason, the refractive index of such a silicon substrate can be controlled by controlling the reverse bias voltage.

In addition, as the proportion, with respect to the light wave guide, of the depletion layer (i.e., PN junction plane) in which the carrier concentration is changeable is greater, the greater amount of change in refractive index of the optical modulation element due to application of reverse bias voltage can be obtained, and thus greater phase modulation can be given to light propagating through the optical waveguide.

The modulation efficiency of the optical modulation element can be evaluated by an overlap integral between the distribution of the amount of change in refractive index and the distribution of propagation modes of light (electric field intensity) in the optical waveguide.

As for the distribution of propagation modes of light, when the size of the optical waveguide in a vertical direction is smaller than the size of the optical waveguide in a horizontal direction, the confinement of light in the vertical direction will be stronger in general. In such an optical waveguide, the electric field intensity of light in the vertical direction per unit length (area) is greater than that in the horizontal direction. Therefore, an increase of the amount of change in refractive index in the vertical direction is a way to improve the modulation efficiency of an optical modulation element.

Hereinafter, an optical modulation element, an optical modulator, and a manufacturing method of an optical modulation element according to embodiments of the present invention will be explained with reference to the accompanied drawings. In the following explanation, a cross section is a face perpendicular to the propagation direction of light in an optical waveguide. For the purpose of explanation, faces such as a top face, a bottom face, and a side face, sections such as an upper section, a lateral section, and a lower section, and directions such as a vertical direction and a horizontal direction are defined with respect to an optical modulation element which is arranged so that its rib pail protrudes upward, and "width" refers to a size in a horizontal direction while "height" refers to a size in a vertical direction. The definitions as to the faces, sections, directions, and the like are not intended to limit absolute position of each element in space.

Figure 1:
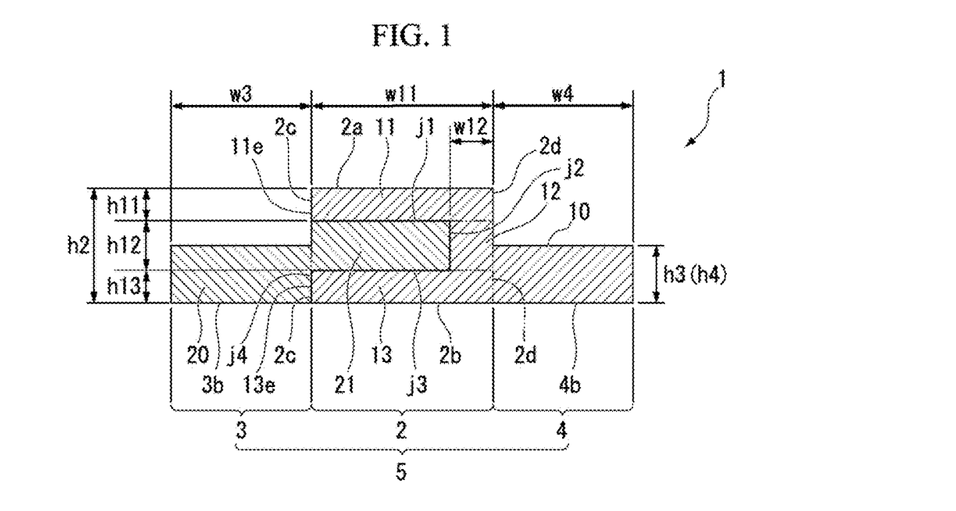
FIG. 1 is a cross-sectional view schematically showing a cross section of an optical modulation element according to an embodiment.

FIG. 1 is a cross-sectional view schematically showing a cross section of an optical modulation element according to an embodiment. The optical modulation element 1 exemplarily shown in the figure includes an optical waveguide 5, the optical waveguide 5 including: a rib part 2 including a top face 2a, a bottom face 2b, a first side face 2c, and a second side face 2d; a first slab part 3 extending from the first side face 2c; and a second slab part 4 extending from the second side face 2d. The rib part 2 of this example has substantially a rectangular shape with a width of w11 and a height of h2. It should be noted that the first side face 2c includes a boundary face between the rib part 2 and the first slab part 3 as well. Similarly, the second side face 2d includes a boundary face between the rib part 2 and the second slab part 4 as well.

The optical waveguide 5 may be formed from silicon. For example, the rib part 2, the first slab part 3, and the second slab part 4 are integrally formed by processing the uppermost silicon (Si) layer of an SOI (Silicon On Insulator) substrate consisting of silicon (Si)-silica ($SiO_2$)-silicon (Si).

In the example shown in FIG. 1, the rib part 2 has substantially a rectangular shape with a width of w11 and a height of h2. The first slab part 3 has substantially a rectangular shape with a width w3 and a height of h3, and the second slab part 4 has substantially a rectangular shape with a width w4 and a height of h4. In addition, the bottom face 2b of the rib part 2 flushes with the bottom face 3b of the first slab part 3 as well as the bottom face 4b of the second slab part 4. Depending on the characteristics required for the optical waveguide 5, the position of the bottom face 2b of the rib part 2 with respect to the bottom face 3b of the first slab part 3 and the bottom face 4b of the second slab part 4 may be preferably adjusted.

The optical waveguide 5 includes a first semiconductor region 10 of a first conductive type and a second semiconductor region 20 of a second conductive type, the second conductive type having electrically an opposite sign from the first conductive type. The first conductive type and the second conductive type are P-type or N-type and having electrically an opposite sign from each other. Specifically, when the first conductive type is P-type, the second conductive type is N-type, and when the first conductive type is N-type, the second conductive type is P-type.

Examples of a dopant which gives P-type conductivity include the group III atoms such as boron (B). A P-type semiconductor region can be obtained by ionically implanting such a dopant into a predetermined region of the optical waveguide 5.

Examples of a dopant which gives N-type conductivity include the group V atoms such as phosphorus (P) and arsenic (As). An N-type semiconductor region can be obtained by ionic-ally implanting such a dopant into a predetermined region of the optical waveguide 5.

The first semiconductor region 10 includes an upper section 11 extending along the top face 2a of the rib part 2, a lateral section 12 extending along the second side face 2d of the rib part 2, and a lower section 13 extending along the bottom face 2b of the rib part 2.

In the example shown in FIG. 1, the upper section 11 has substantially a rectangular shape with a width of w11 and a height of h11. The upper section 11 substantially reaches the top face 2a and the second side face 2d. The lateral section 12 has substantially a rectangular shape with a width of w12 and a height of h12. The lateral section 12 substantially reaches the second side face 2d. The lower section 13 has substantially a rectangular shape with a width of w11 and a height of h13. The lower section 13 substantially reaches the second side face 24 and the bottom face 2b.

The upper section 11, the lateral section 12, the lower section 13, and a semiconductor region of the second slab part 4 together substantially constitute a continuous semiconductor region 10. For the purpose of explanation, the semiconductor region 10 in the rib part 2 is expedientially divided into three sections which are referred to as the upper section 11, the lateral section 12, and the lower section 13.

The second semiconductor region 20 is sandwiched between the upper section 11 and the lower section 13 and substantially in direct contact with the upper section 11, the lateral section 12, and the lower section 13.

In the example shown in FIG. 1, the second semiconductor region 20 extends from the rib part 2 to the first slab part 3 so as to include the center of the rib part 2. A PN junction plane j1 extends in substantially a horizontal direction along the boundary between the second semiconductor region 20 and the upper section 11. A PN junction plane j2 extends in substantially a vertical direction along the boundary between the second semiconductor region 20 and the lateral section 12. A PN junction plane j3 extends in substantially a horizontal direction along the boundary between the second semiconductor region 20 and the lower section 13, while a PN junction plane j4 extends in substantially a vertical direction along the boundary between the second semiconductor region 20 and the lower section 13.

In an embodiment, at least one of an end face 11e of the upper section 11 and an end face 13e of the lower section 13 flushes with the first side face 2c. In the example shown in FIG. 1, both the end faces 11e of the upper section 11 and the end face 13e of the lower section 13 flush with the first side face 2c. In other words, both the upper section 11 and the lower section 13 extend over the entire width of the rib part 2.

Figure 2:
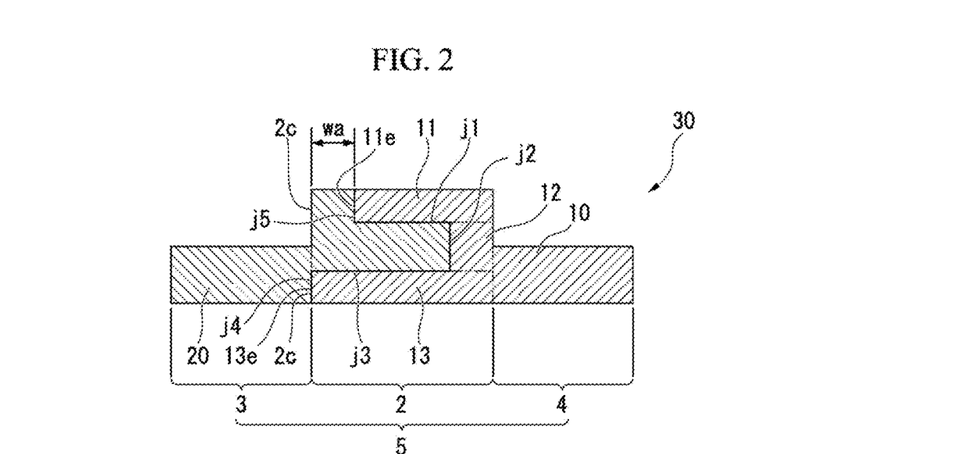
FIG. 2 is a cross-sectional view schematically showing a cross section of an optical modulation element according to a first modified example of the embodiment.
Figure 3:
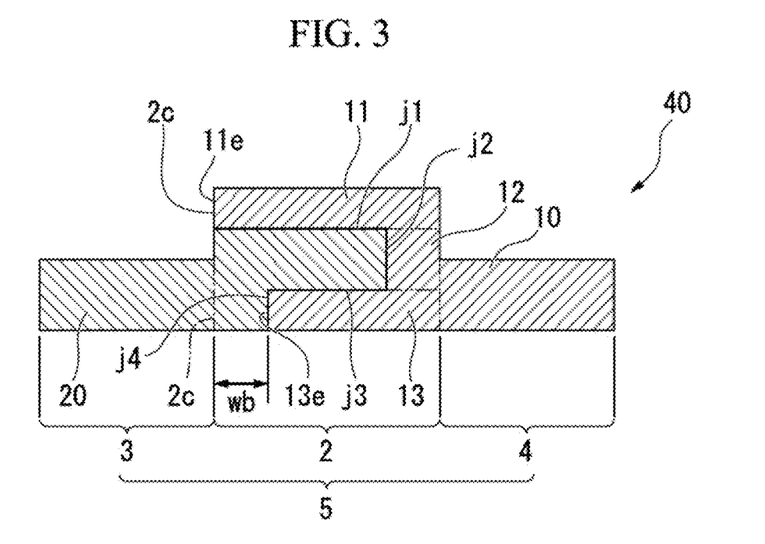
FIG. 3 is a cross-sectional view schematically showing a cross section of an optical modulation element according to a second modified example of the embodiment.
Figure 4:
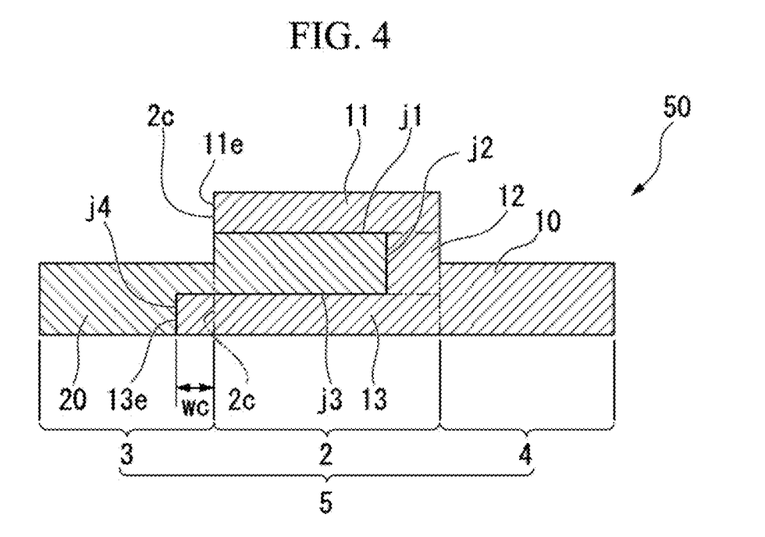
FIG. 4 is a cross-sectional view schematically showing a cross section of an optical modulation element according to a third modified example of the embodiment.

Referring to FIG. 2-FIG. 4, some modified examples of the above-described optical modulation element 1 will be explained, Descriptions of components having the same structure as those of the above-described optical modulation element 1 will be omitted.

FIG. 2 is a cross-sectional view schematically showing a cross section of an optical modulation element 30 according to a first modified example.

As exemplarily shown in the FIG., the end face 11e of the upper section 11 may not flush with the first side face 2c, and only the end face Be of the lower section 13 may flush with the first side face 2c. In the present example, the end face 11e of the upper section 11 is apart from the first side face 2c by a distance of wa. In addition, a PN junction plane j5 extends in substantially a vertical direction along the boundary between the end face 11e of the upper section 11 and the second semiconductor region 20.

FIG. 3 is a cross-sectional view schematically showing a cross section of an optical modulation element 40 according to a second modified example.

As exemplarily shown in the figure, the end face 11e of the upper section 11 may flush with the first side face 2c, and the end face 13e of the lower section 13 may not flush with the first side face 2c. In the present example, the end face 13e of the lower section 13 is apart from the first side face 2c by a distance of wb. In addition, a PN junction plane j4 extends in substantially a vertical direction along the boundary between the end face 13e of the lower section 13 and the second semiconductor region 20.

FIG. 4 is a cross-sectional view schematically showing a cross section of an optical modulation element 50 according to a third modified example.

As exemplarily shown in the figure, the lower section 13 may extend to the inside of the first slab part 3, which is an exception of the above-described expediential definition. As shown in the present example, the end face 11e of the upper section 11 may flush with the first side face 2c, and the end face 13e of the lower section 13 may be in the first slab part 3. In the present example, the end face 13e of the lower section 13 projects from the first side face 2c to the first slab part 3 by a distance of wc. In addition, a PN junction plane j4 extends in substantially a vertical direction along the boundary between the end face 13e of the lower section 13 and the second semiconductor region 20. In this case, the PN junction plane j3 extends in substantially a horizontal direction from the rib part 2 to the first slab part 3, while the PN junction plane j4 extends in substantially a vertical direction in the first slab part 3.

According to the above-described optical modulation elements 1, 30, 40, and 50, it is possible to give a greater area of PN junction planes (relative area with respect to the size of the optical waveguide) in the optical waveguide 5 than that of known optical modulation elements, where the PN junction planes are the boundary faces between the first semiconductor region 10 and the second semiconductor region 20. In other words, it is possible, in the optical waveguide 5, to secure a greater area of portion s where the amount of change in refractive index is large. Accordingly, it is possible to provide an optical modulation element with higher modulation efficiency.

In addition, in the first semiconductor region 10, since at least one of the end face 11e of the upper section 11 and the end face 13e of the lower section 13 flushes with the first side face 2c of the rib part 2, at least one PN junction plane (depletion layer), which extends in substantially a horizontal direction and reaches the first side face 2c, exists in the rib part 2.

Accordingly, it is possible to increase the amount of change in refractive index in a vertical direction in the vicinity of the first side face 2c, and thus improve the modulation efficiency of the optical modulation element 1 as a whole.

In the first semiconductor region 10, when both of the end face 11e of the upper section 11 and the end face 13e of the lower section 13 flush with the first side face 2c of the rib part 2, two PN junction planes (depletion layers), which extend in substantially a horizontal direction and reach the first side face 2c, will exist in the rib part 2. In this case, it is possible to further increase the amount of change in refractive index in a vertical direction in the vicinity of the first side face 2c, and thus further improve the modulation efficiency of the optical modulation element 1 as a whole.

When the lower section 13 extends to the first slab part 3, a PN junction plane (depletion layer), which extends through the first side face 2c of the rib part 2 to the first slab part 3 in a horizontal direction, will exist. In this case, it is possible to increase the amount of change in refractive index in a vertical direction in the rib part 2 and the first slab part 3 as well. Therefore, it is possible to improve the modulation efficiency for the light mode in the first slab part 3, and thus further improve the modulation efficiency of the optical modulation element 1 as a whole.

In particular, as exemplarily shown in FIG. 4, when the lower section 13 extends to the first slab part 3 and the end face 11e of the upper section 11 flushes with the first side face 2c of the rib part 2, two PN junction planes (depletion layers) which extend in substantially a horizontal direction and reach the first side face 2c, will exist in the rib part 2, and a PN junction plane (depletion layer), which extends in substantially a horizontal direction in the first slab part 3, will also exist.

In this case, it is possible to increase the amount of change in refractive index in a vertical direction in the first slab part 3, and further increase the amount of change in refractive index in a vertical direction in the rib part 2. Accordingly, it is possible to further improve the modulation efficiency of the optical modulation element 1 as a whole.

In the above-described optical modulation elements 1, 30, 40, and 50, the first conductive type may be N-type, and the second conductive type may be P-type. In this case, it is possible to increase the amount of change in hole concentration in the vicinity of the center of the optical waveguide 5 where the intensity of light mode is generally the greatest. Therefore, it is possible to provide an optical modulation element with even higher modulation efficiency, which is clear from the above-described Equation 1.

Figure 5A:
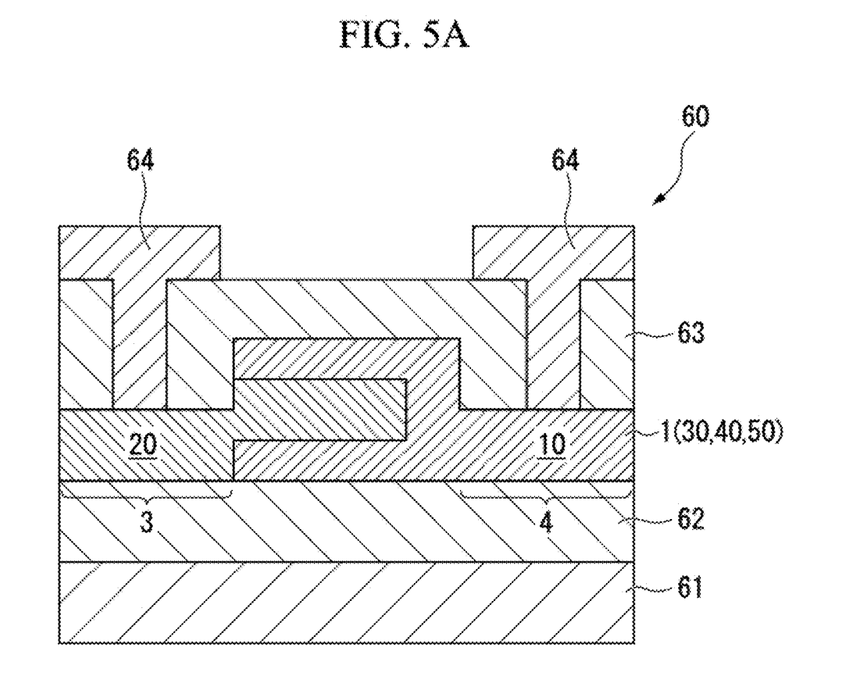
FIG. 5A is a cross-sectional view schematically showing a cross section of a phase modulation module according to an embodiment.

FIG. 5A is a cross-sectional view schematically showing a cross section of a phase modulation module according to an embodiment. A phase modulation module 60 exemplarily shown in the figure includes a substrate 61, a lower cladding 62, the optical modulation element 1, an upper cladding 63, and two electrodes 64. In the present example, the optical modulation element serves as a core. The phase modulation module 60 may include the above-described optical modulation elements 30, 40, or 50 instead of the optical modulation element 1.

Examples of a material for the substrate 61 include undoped silicon. Examples of a material for the lower cladding 62 on the top face of the substrate 61 include silica ($SiO_2$). Examples of a material for the upper cladding 63 on the top face of the optical modulation element 1 (30, 40, 50) include silica ($SiO_2$).

Such a component including the substrate 61, the lower cladding 62, the optical modulation element 1 (30, 40, 50), and the upper cladding 63 can be obtained by, for example, processing an SOI substrate, performing doping to the uppermost silicon layer, and then depositing silica on the silicon layer.

The two electrodes 64 are connected to and make an Ohmic contact with the first slab part 3 and the second slab part 4, respectively. Application of reverse bias voltage between the two electrodes 64 enables optical modulation as described above. The material of the electrode 64 is not limited as far as it is capable of forming an Ohmic contact with silicon material (e.g., aluminum) and may be an elemental atom or an alloy.

According to the above-described phase modulation module 60, because of the high modulation efficiency of the optical modulation element 1 (30, 40, 50), it is possible to provide a phase modulation module with higher modulation efficiency without changing the other components.

Figure 5B:
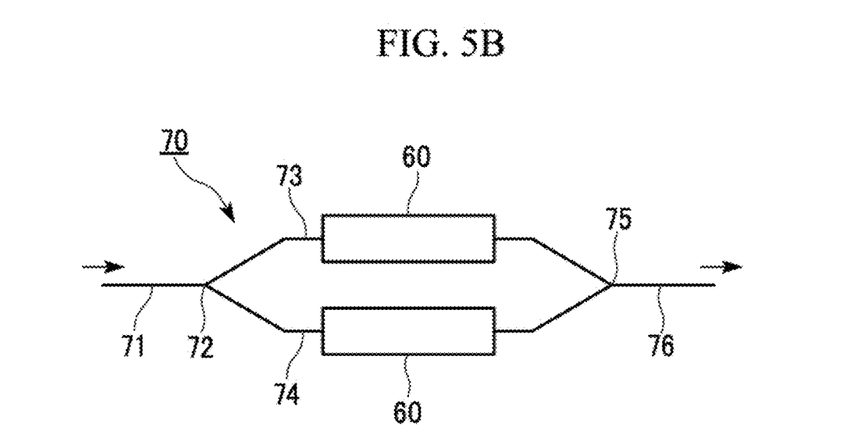
FIG. 5B is a schematic view showing an optical modulator according to at embodiment.

FIG. 5B is a schematic view showing an optical modulator according to an embodiment. An optical modulator 70 exemplarily shown in the figure includes two phase modulation modules 60 described above. Light incident from an incident part 71 to the optical modulator 70 is demultiplexed into two by a demultiplexer 72 and guided to two arms 73 and 74. Each of the arms 73 and 74 is provided with a phase modulation module 60 with which phase modulation is performed in each of the arms 73 and 74. The lights passing through the arms 73 and 74 are multiplexed by the multiplexer 75 and outputted to an emission part 76. Accordingly, intensity modulation and/or phase modulation can be performed depending on the phase difference between the lights passing though the arms 73 and 74.

The phase modulation module 60 may be provided in either one of the two arms 73 and 74.

According to the above-described optical modulator 70, because of the phase modulation module 60 including the optical modulation element 1 (30, 40, 50) with high modulation efficiency, it is possible to provide a phase modulator with higher modulation efficiency without changing the other components.

FIG. 6A-FIG. 6D and FIG. 7A-FIG. 7D are a cross-sectional view schematically showing a manufacturing step of an optical modulation element according to an embodiment. Referring to FIG. 6A-FIG. 6D, one example of manufacturing method of an optical modulation element 1 having the structure exemplarily shown in FIG. 1 will be explained in detail.

Figure 6A:
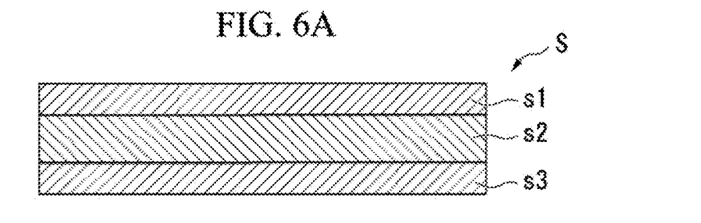
FIG. 6A is a cross-sectional view schematically showing a manufacturing step of an optical modulation element according to an embodiment.

Referring to FIG. 6A, a first conductive type dopant and a second conductive type dopant having electrically an opposite sign from the first conductive type are implanted to a substrate S to form a first layer s1 of the first conductive type, a second layer s2 of the second conductive type and a third layer s3 of the first conductive type in the substrate S such that the first to third layers are arranged in this order along the thickness direction of the substrate S.

Examples of a material for the substrate S include a semiconductor material such as silicon. The first conductive type and the second conductive type are P-type or N-type and have electrically an opposite sign from each other.

It should be noted that the number of the implantations of the dopant is determined based on the type of the dopant, the target depth of the dopant to be implanted, and the like (the same is true in the following explanation).

Figure 6B:
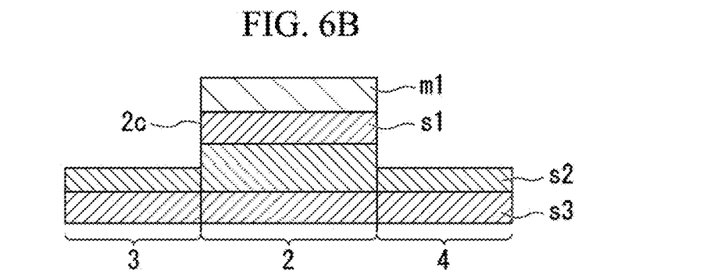
FIG. 6B is a cross-sectional view schematically showing a manufacturing step following the step shown in FIG. 6A.

Referring to FIG. 6B, a first mask m1 is formed on the surface of the first layer s1, and then the first layer s1 and the upper part of the second layer s2 are removed at which the first mask m1 has not been formed to form the first slab part 3, the second slab part 4, and the rib part 2 which is covered with the first mask m1.

In this step, it is possible to allow the end face of the first conductive type region formed in the first layer s1 to flush with the first side face 2c of the rib part 2 with excellent accuracy.

Examples of the first mask m1 and second-fifth masks m2-m5 to be described later include a resist film and a $SiO_2$ film. The removal of the first layer s1 and the upper part of the second layer s2 may be performed using a known method such as etching.

Figure 6C:
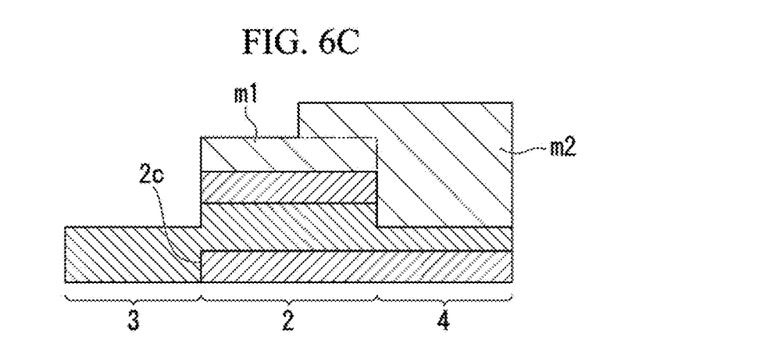
FIG. 6C is a cross-sectional view schematically showing a manufacturing step following the step shown in FIG. 6B.

Referring to FIG. 6C, the second mask m2 is formed on part of the surface of the first mask m1 and the entire surface of the second slab part 4. A dopant of the second conductive type is injected over the first mask m1 and the second mask m2 to implant the dopant of the second conductive type into the first slab part 3.

In this step, the conductive type of the third layer s3 in the first slab part 3 is reversed from the first conductive type to the second conductive type, and thus the entire region of the first slab part 3 becomes the second conductive type.

Since the implantation of the second conductive type dopant is performed with the use of the first mask m1 which has been used for the formation of the first slab part 3, the second slab part 4, and the rib part 2, it is possible to allow the boundary face (PN junction plane) between the first conductive type region and the second conductive type region in the third layer s3 to flush with the first side face 2c of the rib part 2 with excellent accuracy.

Further, the end face the second mask m2 requires no positional accuracy on the rib part 2 as far as the second mask m2 covers the entire surface of the second slab part 4. Accordingly, it is possible to improve the manufacturing efficiency.

Figure 6D:
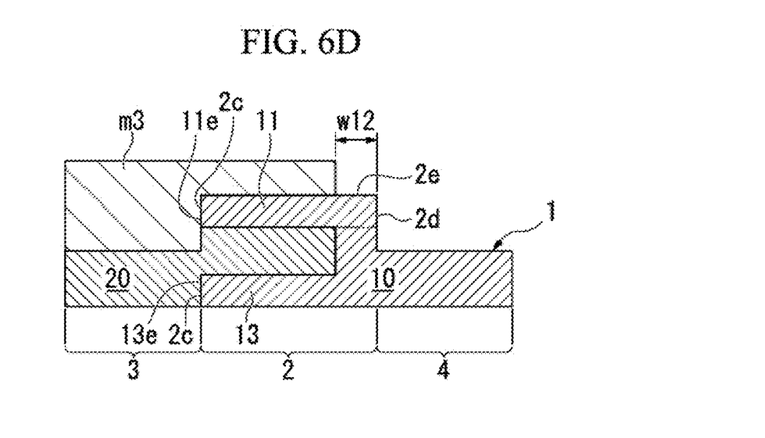
FIG. 6D is a cross-sectional view schematically showing a manufacturing step following the step shown in FIG. 6C.

Referring to FIG. 6D, after removal of the first mask m1 aid the second mask m2, the third mask m3 is formed on the entire surface of the first slab part 3 of the second conductive type and part of the surface of the rib part 2 such that the surface of the rib part 2 is exposed from the mask m3 in the vicinity of the second side face 2d.

In the example shown in the figure, the third mask m3 is formed such that the surface 2e of the rib part 2 is exposed from the mask m3 over a distance of w12 from the second side face 2d. The distance w12 is determined such that the target width of the lateral section is obtained in the final optical modulation element.

A dopant of the first conductive type is injected over the third mask m3 to implant the dopant of the first conductive type into a region over the second slab part 4 and the rib part 2, the region exposed from the third mask m3.

In this step, the conductive type of the second layer s2 is reversed from the second conductive type to the first conductive type, and thus the entire region of the second slab part 4 and the exposed region of the rib part 2 (over the distance of w12 from the second side face 2d) become the first conductive type. After removal of the third mask m3, the optical modulation element 1 is obtained.

According to the above-described manufacturing method, it is possible to allow the end face 11e of the upper section 11 and the end face 13e of the lower section 13 to flush with the first side face 2c of the rib part 2 with excellent accuracy. Therefore, it is possible to provide an optical modulation element 1 capable of obtaining a great amount of change in refractive index in a vertical direction in the vicinity of the first side face 2c and high modulation efficiency.

Modified Example

As an another example of the manufacturing method of an optical modulation element according to an embodiment, a manufacturing method of the optical modulation element 50 having the structure exemplarily shown in FIG. 4 will be explained in detail with reference to FIG. 7A-FIG. 7D.

Figure 7A:
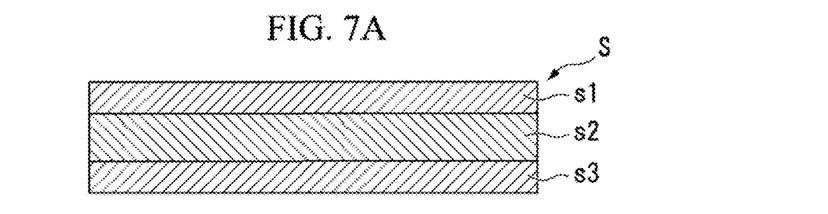
FIG. 7A is a cross-sectional view schematically showing a manufacturing step of an optical modulation element according to an embodiment.
Figure 7B:
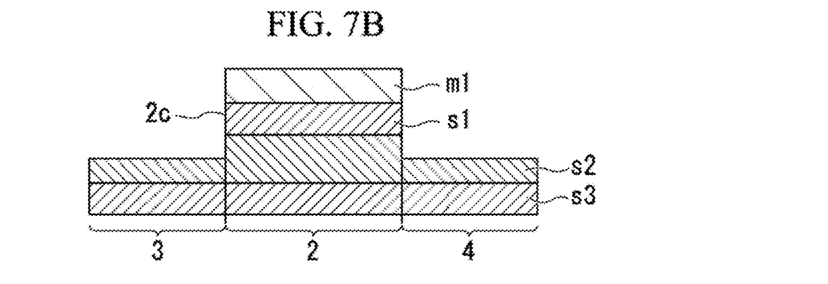
FIG. 7B is a cross-sectional view schematically showing a manufacturing step following the step shown in FIG. 7A.

Referring to FIG. 7A and FIG. 7B, in the same way as the above-described manufacturing method, the first slab part 3, the second slab part 4, and the rib part 2 which is covered with the first mask m1 are formed. The first conductive type dopant and the second conductive type dopant are implanted to the substrate S to form a first layer s1 of the first conductive type, a second layer s2 of the second conductive type and a third layer s3 of the first conductive type in the substrate S such that the first to third layers arranged in this order along the thickness direction of the substrate S. After that, the first mask m1 is removed.

Figure 7C:
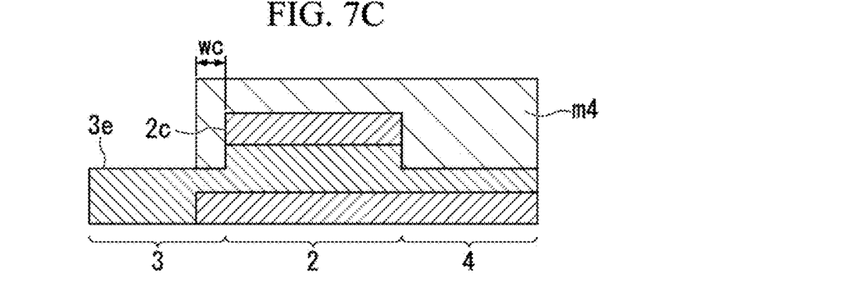
FIG. 7C is a cross-sectional view schematically showing a manufacturing step following the step shown in FIG. 7B.

Referring to FIG. 7C, a fourth mask m4 is formed to cover the entire surface of the rib part 2, the entire surface of the second slab part 4, and the surface of the first slab part 3 such that the surface 3e of the first slab part 3 is exposed from the fourth mask m4 except for the region in the vicinity of the first side face 2c.

In the example shown in the figure, the fourth mask m4 covers the first slab part 3 over a distance of wc from the first side face 2c. The distance wc is determined such that the target width of the lower section is obtained in the final optical modulation element.

A dopant of the second conductive type is injected over the fourth mask m4 to implant the dopant of the second conductive type into a region of the first slab part 3, the region exposed from the fourth mask m4.

In this step, the conductive type of the third layer s3 is reversed from the first conductive type to the second conductive type, and thus the entire region of the first slab part 3 except for the region in the vicinity of the first side face 2c (over the distance of wc from the first side face 2e) becomes the second conductive type.

Figure 7D:
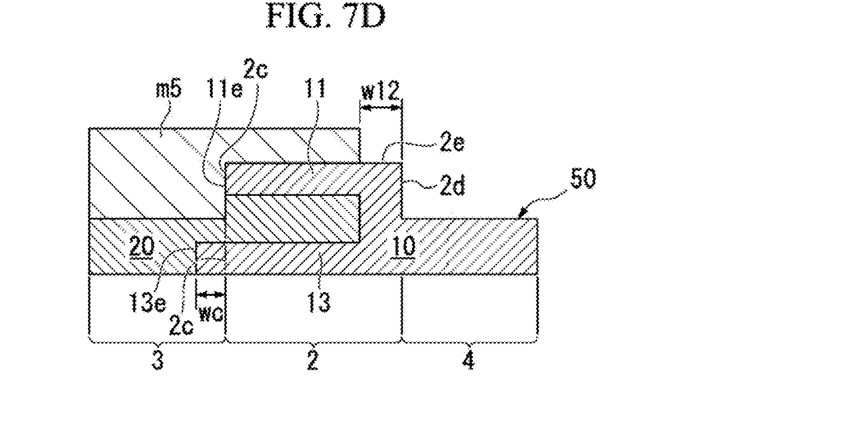
FIG. 7D is a cross-sectional view schematically showing a manufacturing step following the step shown in FIG. 7C.

Referring to FIG. 7D, after removal of the fourth mask m4, a fifth mask m5 is formed on the entire surface of the first slab part 3 of the second conductive type and the surface of the rib part 2 such that the surface of the rib part 2 is exposed in the vicinity of the second side face 2d.

In the example shown in the figure, the fifth mask m5 is formed such that a surface 2e of the rib part 2 is exposed over a distance of w12 from the second side face 2d. The distance w12 is determined such that the target width of the lateral section is obtained in the final optical modulation element.

A dopant of the first conductive type is injected over the fifth mask m5 to implant the dopant of the first conductive type into a region over the second slab part 4 and the rib part 2, the region exposed from the fifth mask m5.

In this step, the conductive type of the second layer s2 is reversed from the second conductive type to the first conductive type, and thus the entire region of the rib part 2 and the exposed region of the rib part 2 (over the distance of w12 from the second side face 2d) become the first conductive type. After removal of the fifth mask m5, the optical modulation element 50 is obtained.

According to the above-described manufacturing method, it is possible to allow the end face 11e of the upper section 11 of the first semiconductor region 10 to flush with the first side face 2c of the rib part 2 with excellent accuracy. In addition, it is possible to form the lower section 13 extending to the first slab part 3 through the first side face 2c of the rib part 2. Therefore, it is possible to provide an optical modulation element 50 capable of obtaining a great amount of change in refractive index in a vertical direction in the first slab part 3 as well as the rib part 2 and thus obtaining high modulation efficiency.

EXAMPLES

The modulation efficiency of the above-described optical modulation element 1 was evaluated using simulations. For comparison purposes, an optical modulation element according to a conventional example was evaluated in the same way.

Figure 12:
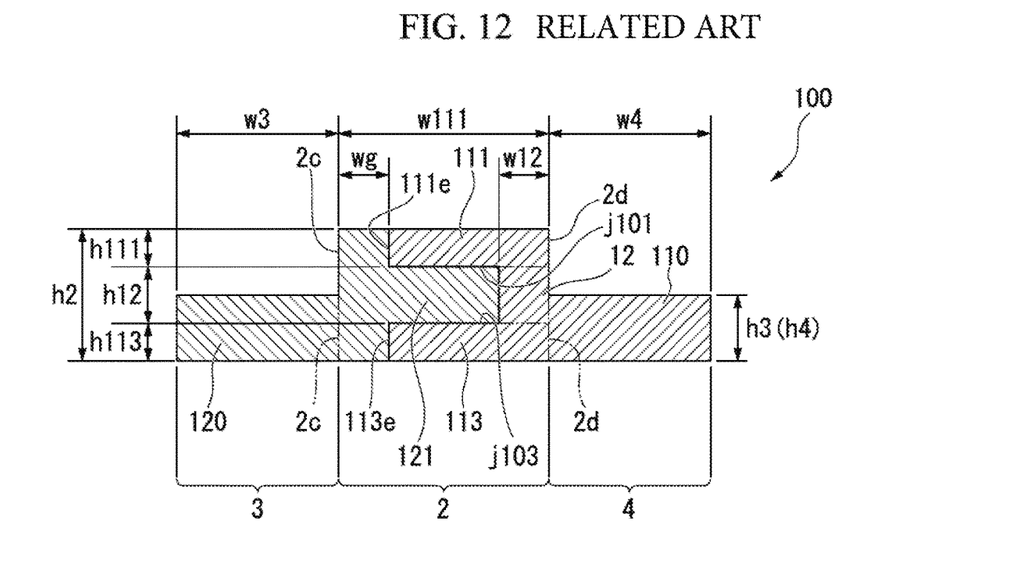
FIG. 12 is a cross-sectional view schematically showing a cross section of an optical modulation element according to a conventional example.

Referring to FIG. 12, an optical modulation element 100 according to a conventional example has the same structure as the above-described optical modulation element 1 except for the first semiconductor region and the second semiconductor region.

A first semiconductor region 110 of the optical modulation element 100 has an upper section 111 and a lower section 113 which do not reach the first side face 2c of the rib part 2.

In the example shown in FIG. 12, the upper section 111 has substantially a rectangular shape with a width of w111 and a height of h111, while the lower section 113 has substantially a rectangular shape with a width of w111 and a height of h113. An end face 111e of the upper section 111 and an end face 113e of the lower section 113 are apart from the first side face 2c by a distance of wg. More specifically, the second semiconductor region 120 having a width of wg extends between the end face 111e of the upper section 111 and the first side face 2c and between the end face 113e of the lower section 113 and the first side face 2c.

In other words a PN junction plane j101 extending in substantially a horizontal direction along the boundary between the second semiconductor region 120 and the upper section 111 and a PN junction plane j103 extending in substantially a horizontal direction along the boundary between the second semiconductor region 120 and the lower section 113 do not reach the first side face 2c. Accordingly, no PN junction plane (depletion layer) exists in substantially a horizontal direction in the vicinity of the first side face 2c of the optical modulation element 100.

Simulations were performed to evaluate the optical modulation element 100 and the above-described optical modulation element 1 under the following conditions.

<Size of Optical Modulation Element 1>
h3=100 nm, w11=500 nm, h2=220 nm, h11=h13=70 nm, w12=70 nm, h12=80 nm <Size of Optical Modulation Element 100>
h3=100 nm, w111=430 nm, h2=220 nm, h111=h113=70 nm, w12=70 nm, h12=80 nm <Semiconductor Region>
First conductive type: N-type
Second conductive type: P-type
Initial value of electron concentration (first semiconductor region): $1.0 \times 10^{18}/cm^3$
Initial value of hole concentration (second semiconductor region): $1.5 \times 10^{18}/cm^3$ <Light Propagating in Optical Waveguide>
Wavelength: 1.55 μm, Polarization: TE mode With the initial values of the electron concentration and the hole concentration (carrier concentration) described above, the amount of change in carrier concentration was calculated for each reverse bias voltage, each calculated amount of change in concentration was converted into the amount of change in refractive index using Equation 1, and thus the effective refractive index of the optical waveguide (optical modulation element) was obtained for each reverse bias voltage. Based on the obtained effective refractive index, the phase shift amount with respect to the phase at a reverse bias voltage of 1V was obtained for each reverse bias voltage. Similarly, the light absorption loss was obtained for each reverse bias voltage using Equation 2.

Figure 8:
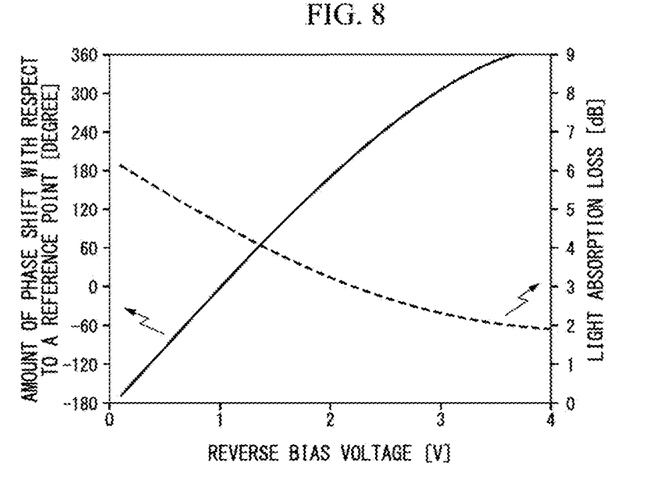
FIG. 8 is a graph showing the modulation efficiency of an optical modulation element according to an embodiment.
Figure 10:
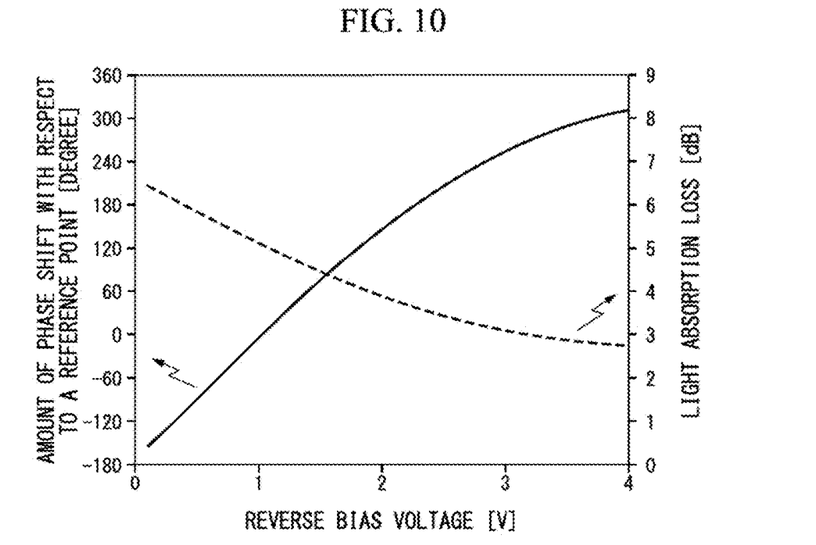
FIG. 10 is a graph showing the modulation efficiency of an optical modulation element according to a conventional example.

FIG. 8 and FIG. 10 are a graph for the optical modulation element 1 and the optical modulation element 100, respectively, each showing a relationship between the reverse bias voltage and the amount of phase shift (phase shift amount) and a relationship between the reverse bias voltage and the light absorption loss, From a comparison of FIG. 8 and FIG.

10, it is understood that the optical modulation element 1 is more advantageous than the optical modulation element 100 in terms of the phase shift amount (efficiency) and the light absorption loss.

Particularly, it is understood that the voltage required to shift the phase 180 degrees more from the reference phase at a reverse bias voltage of 1V is +1.0V for the optical modulation element 1 and +1.2V for the optical modulation element 100. In addition, the light absorption loss at a reverse bias voltage of 2V is 3.3 dB for the optical modulation element 1 and 3.9 dB for the optical modulation element 100.

Performance indices for the modulation efficiency of the optical modulation element may include the product of the above-described required voltage and the light absorption loss. The product is 3.3 for the optical modulation element 1 and 4.7 for the optical modulation element 100. In terms of the performance index, it can be said that the structure of the optical modulation element 1 is more suitable than the structure of the optical modulation element 100 for obtaining higher modulation efficiency.

Figure 9:
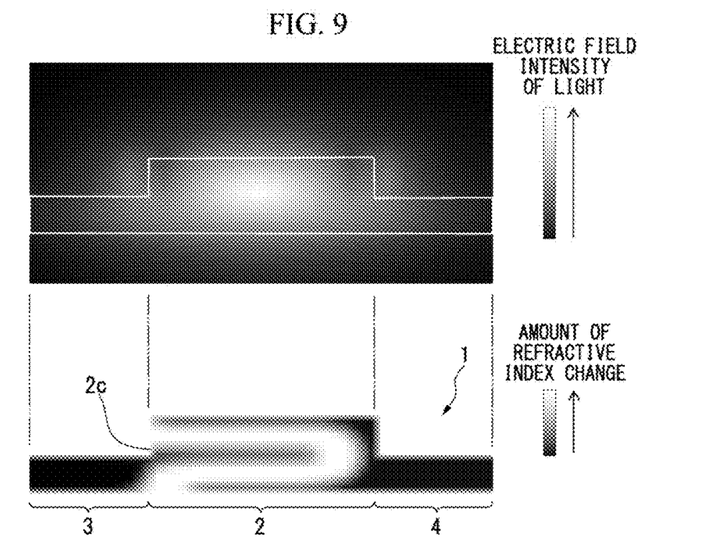
FIG. 9 is simulated images showing the distribution of electric Held intensity of light and amount of refractive index change in an optical modulation element according to an embodiment.
Figure 11:
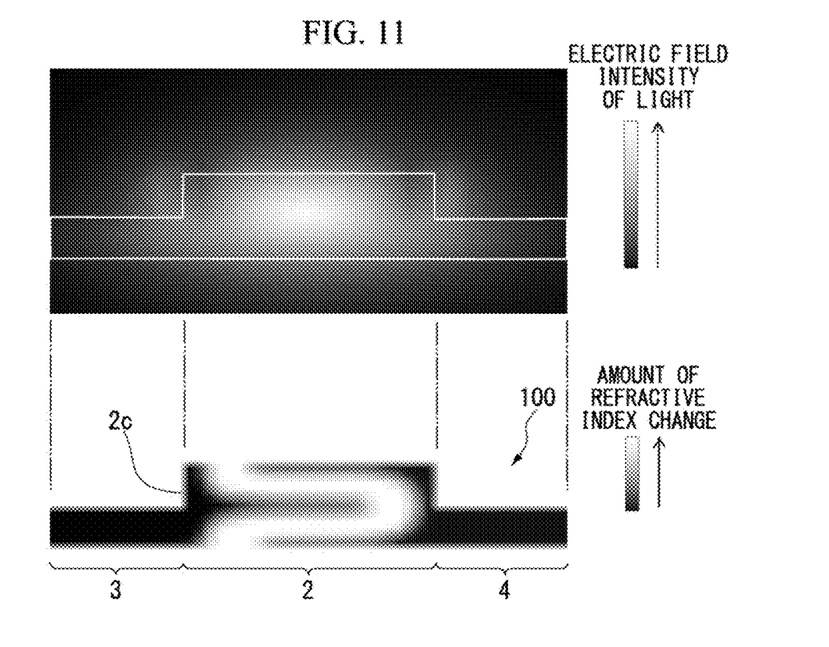
FIG. 11 is simulated images showing the distribution of electric field intensity of light and amount of refractive index change in an optical modulation element according to a conventional example.

FIG. 9 and FIG. 11 are simulated images for the optical modulation element 1 and the optical modulation element 100, respectively, each showing the distribution of the light mode (electric field intensity of light), and the distribution of the amount of change in refractive index (amount of refractive index change), when applying a reverse bias voltage of 2V. The light mode distributions (upper images) are shown in gray scale with white color representing the highest concentration of the light mode (strongest) and black color representing the lowest concentration of the light mode (weakest). The distributions of the amount of the refractive index change (lower images) are also shown in gray scale with white color representing the greatest amount of the refractive index change and black color representing the smallest amount of the refractive index change.

Each distribution of the light mode was calculated using the finite element method. Each amount of change in refractive index was obtained by calculating the amount of change in carrier concentration using the potential equation and the carrier transportation equation with die above-described initial values of the hole concentration and the electron concentration (carrier concentration), and then substituting the calculated amount of change in carrier concentration into Equation 1.

As is appreciated from the light mode distributions shown in FIG. 9 and FIG. 11, the light is more strongly confined in the vertical direction in the cross section of the optical modulation element 1 and the optical modulation element 100.

The distribution of the amount of change in refractive index, which affects the light mode distribution, is different between the optical modulation element 1 and the optical modulation element 100. In particular, the distribution of the amount of change in refractive index is considerably different in the vicinity of the first side face 2c of the rib part 2.

As is clear from FIG. 9 and FIG. 11, in the vicinity of the first side face 2c of the optical modulation element 1, the great amount of change in refractive index in the vertical direction is observed. On the other hand, in the vicinity of the first side face 2c of the optical modulation element 100, the refractive index change in the vertical direction is hardly observed although the change in the horizontal direction is observed to some extent.

As explained above, it is understood that the amount of change in refractive index in the vertical direction of the optical modulation element 1 in the vicinity of the first side face 2c of the rib part 2 is greater than that of the optical modulation element 100 according to a conventional example. According to the optical modulation element 1, it is possible to provide an optical modulation element with higher modulation efficiency as a whole, compared to the optical modulation element 100 according to a conventional example.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, aid is only limited by the scope of the appended claims.

What is claimed is:

1. An optical modulation element comprising an optical waveguide, the optical waveguide comprising:
   a rib part having a top face, a bottom face, a first side face, and a second side face;
   a first slab part extending from the first side face; and
   a second slab part extending from the second side face,
   wherein the optical waveguide comprises a first semiconductor region of a first conductive type and a second semiconductor region of a second conductive type, the second conductive type having electrically an opposite sign from the first conductive type,
   wherein the first semiconductor region comprises an upper section extending along the top face of the rib part, a lateral section extending along the second side face of the rib part, and a lower section extending along the bottom face of the rib part,
   wherein the second semiconductor region is sandwiched between the upper section of the first semiconductor region and the lower section of the first semiconductor region so as to be substantially in contact with the upper section, the lateral section, and the lower section of the first semiconductor region,
   wherein at least one of an end face of the upper section of the first semiconductor region and an end face of the lower section of the first semiconductor region is flush with the first side face of the rib part, and
   wherein the second semiconductor region extends along the end face of the lower section of the first semiconductor region to have a PN junction plane along a boundary between the end face of the lower section of the first semiconductor region and the second semiconductor region.

2. The optical modulation element according to claim 1, wherein both of the end face of the upper section of the first semiconductor region and the end face of the lower section of the first semiconductor region are flush with the first side face of the rib part.

3. The optical modulation element according to claim 1, wherein the lower section of the first semiconductor region extends to the inside of the first slab part.

4. The optical modulation element according to claim 1, wherein the first conductive type is N-type, and
   wherein the second conductive type is P-type.

5. An optical modulator comprising an optical modulation element according to claim 1.

* * * * *